United States Patent
Kolk et al.

(10) Patent No.: US 6,785,630 B2
(45) Date of Patent: Aug. 31, 2004

(54) TEMPERATURE CONTROL BALANCING DESIRED COMFORT WITH ENERGY COST SAVINGS

(75) Inventors: Richard A. Kolk, Glastonbury, CT (US); Raymond J. Archacki, Jr., Wethersfield, CT (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/067,103

(22) Filed: Feb. 4, 2002

(65) Prior Publication Data

US 2003/0149539 A1 Aug. 7, 2003

(51) Int. Cl.[7] .............................. G06F 15/00; F25B 29/00
(52) U.S. Cl. .................. 702/130; 705/411; 340/870.02; 236/51
(58) Field of Search ............ 236/49.3, 51; 340/870.02; 702/130; 700/38, 44; 703/2; 237/8 R

(56) References Cited

U.S. PATENT DOCUMENTS

| | | | |
|---|---|---|---|
| 5,833,134 A | * | 11/1998 | Ho et al. .................... 236/49.3 |
| 5,926,776 A | | 7/1999 | Glorioso et al. |
| 6,285,971 B1 | * | 9/2001 | Shah et al. ..................... 703/2 |
| 6,439,469 B1 | * | 8/2002 | Gruber et al. ............... 237/8 R |

* cited by examiner

*Primary Examiner*—Kamini Shah
(74) *Attorney, Agent, or Firm*—Carlson, Gaskey & Olds

(57) ABSTRACT

A temperature regulating system utilizes changing energy price information to alter the system operation. A performance index value is determined that indicates a balance between a user's preference for maintaining a setpoint temperature and a need for maintaining energy cost savings. The performance index value is related to the current energy price and the system automatically responds to rising energy prices by reducing system operation in a manner that provides cost savings according to a user's specified preference for weighting temperature comfort levels compared to energy cost savings. According to the described example, an optimal control solution is used to determine the performance index value.

18 Claims, 2 Drawing Sheets

- DETERMINE USER DEFINED PARAMETERS $A, B, Q, R_N$
- DETERMINE CURRENT TEMPERATURE
- DETERMINE TARGET TEMPERATURE
- DETERMINE CURRENT ENERGY COST
- DETERMINE PERFORMANCE INDEX VALUE $PI = \int_0^\infty (QT^2 + Ru^2)du$
- AUTOMATICALLY ADJUST SYSTEM SENSITIVITY TO TEMPERATURE DIFFERENCE

TEMPERATURE CONTROL BALANCING DESIRED COMFORT WITH ENERGY COST SAVINGS

BACKGROUND OF THE INVENTION

This invention generally relates to temperature control systems. More particularly, this invention relates to a temperature control strategy that balances a user's desired temperature comfort level with energy cost savings responsive to changes in energy pricing.

Temperature control arrangements for buildings typically include a thermostat device that allows an individual to choose a setpoint temperature so that the heating or cooling system will operate to compensate for any difference in the actual temperature and the setpoint temperature in a conventional manner. Recent advances in thermostat devices include programmable thermostats that allow an individual to select various target temperatures at different time periods during a week, for example. Based upon the individual's knowledge regarding occupancy and use, the setpoint temperatures can be set in a manner that minimizes energy usage and, therefore, provides a cost savings during system operation.

While programmable thermostats are an advancement, they are not capable of addressing situations where energy prices may change during one or more of the preset periods during which a setpoint temperature is selected. More recently, there has been a trend among energy providers to alter energy costs throughout a day responsive to increased usage at particular times of the day or during particular temperature extremes, for example. Conventional thermostat arrangements are not able to adequately address the need to allow an individual to realize energy cost savings in the face of changing energy prices.

One proposal is shown in U.S. Pat. No. 5,926,776, which allows a thermostat to communicate with an energy provider. In that patent, the thermostat allows an individual to select different temperature setpoints to correspond to different energy cost levels. One shortcoming of such an arrangement is that the individual is unable to predict how often or by how much the energy price will change and, therefore, may not be able to adequately select different setpoint temperatures to achieve a desired system performance and comfortable temperatures. Another shortcoming of that arrangement is that it does not account for an individual's preferences to balance between energy cost savings and maintaining a setpoint temperature.

There is a need for an improved arrangement that accommodates varying energy price levels and balances those against an individual's stated preference for balancing the desired comfort level with energy cost savings. This invention addresses that need in a unique manner.

SUMMARY OF THE INVENTION

In general terms, this invention is a system for controlling the operation of a heating or air conditioning system, for example, that automatically adjusts the performance of the system based upon changes in energy pricing according to an individual's stated preference for balancing energy cost savings with desired temperature levels.

In one example system designed according to this invention, a thermostat device has an input portion that allows an individual to enter information regarding a desired setpoint temperature. The input portion also allows an individual to enter information regarding the individual's preference for balancing between maintaining energy cost savings and maintaining a desired temperature level. The thermostat device also includes a sensor portion that provides an indication of a current temperature near the thermostat device. A communication module is capable of receiving information from an outside source remote from the thermostat device. Example information includes pricing information regarding energy cost. The communication module facilitates a controller determining a current energy price from information from the outside source. The controller determines a performance index value that indicates a balance between the user-specified desire to maintain the setpoint temperature and energy cost savings. The controller automatically adjusts the system sensitivity to a difference between the current temperature and the setpoint temperature according to the performance index value.

In one example, the controller uses an optimal control solution approach to determine the performance index value, which balances the system's performance for maintaining the setpoint temperature with the need for energy cost savings according to a user's specified preference between those two. According to one example, the controller automatically slows down a response time of the system to temperature differences between the setpoint temperature and the current temperature within the corresponding portion of the building.

A method of this invention for controlling a temperature regulating system includes defining a performance index that indicates a desired balance between maintaining a user selected setpoint temperature and conserving energy cost. Once a current energy cost is determined, a value of the performance index can be determined. In one example, an optimal control solution is used to determine the value of the performance index. The sensitivity of the system to the difference between the setpoint temperature and the current actual temperature is adjusted according to the performance index value.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
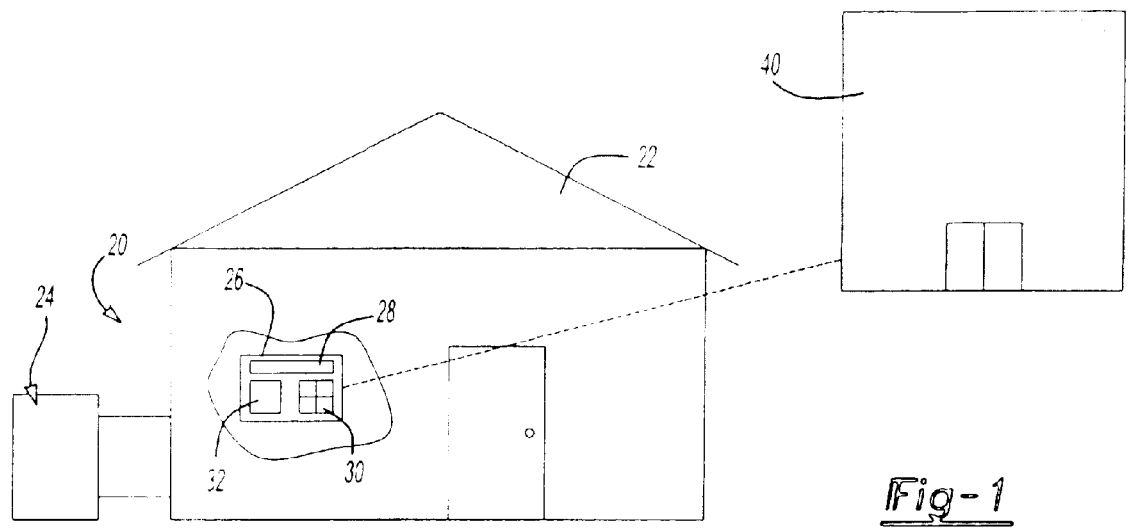
FIG. 1 schematically illustrates selected portions of a system designed according to this invention.

A temperature regulating system 20 for heating or cooling a building 22 is at least partially schematically illustrated in FIG. 1. A heating, ventilation and cooling system 24 provides a desired amount of heating or cooling within the building 22. The HVAC system 24 may take a variety of forms. In one example, the HVAC system 24 is an air conditioning system, in another example it is a heat pump. A variety of HVAC systems can be used in accordance with this invention. The invention is not limited to one particular type of HVAC system.

The system 20 includes a thermostat device 26 strategically positioned within the building 22 to provide the ability to control temperatures within one or more portions of the building 22 or the entire building, depending on the needs of a particular situation. The thermostat device 26 includes a display 28 that allows an individual to view items such as current setpoint temperature, current measured temperature, etc. A user interface 30, such as a keypad, allows the user to input information such as a desired setpoint temperature. Other information can be input through the user interface 30 as will be described below.

The thermostat device 26 includes a temperature sensor portion that uses conventional technology to determine the current actual temperature in the vicinity of the thermostat device 26. A controller 32, which in one example is a microprocessor, preferably is programmed to cause the system 24 to operate according to the user's specified desires (such as the setpoint temperature) and implements the temperature control strategy of this invention. Given this description, those skilled in the art will be able to suitably program a microprocessor or other controller to perform the functions of the example controller 32.

It should be noted that within this description to the extent that portions or modules are described, they are described for discussion purposes only and do not require discrete components or discrete portions of software, for example. The controller 32 may comprise multiple microprocessors, dedicated circuitry, software or any combination of those within a single component or multiple components, depending on the needs of a particular situation.

One aspect of the thermostat device 26 is that it preferably includes a communication module, which in the illustrated example is a portion of the controller 32, that is capable of communicating with a remotely located outside source 40. One example outside source is a utility company that provides pricing information, for example, to the thermostat device 26. The communication module may communicate with the outside source 40 over existing telephone lines, through the internet or by other suitable communication means.

The inventive arrangement is particularly useful for situations where an energy company or another outside source periodically changes the cost or pricing of energy supplied to run the HVAC system 24. The controller 32 preferably gathers the price change information and utilizes that to determine whether the system operation should be altered to accommodate an individual's preselected preference for balancing temperature comfort levels with energy cost savings.

According to this invention, an optimal control solution is used to balance the sometimes competing interests in maintaining temperature comfort levels and maintaining energy cost savings as the price of the energy changes.

According to one example, the user of the system, such as a homeowner for example, supplies information to the controller 32 utilizing the user interface 30. Example information that is provided by the user includes a setpoint temperature at which the user desires the HVAC system 24 to maintain the appropriate portions of the building 22. According to one example, the setpoint temperature is set on a schedule so that portions of days can have different setpoint temperatures than other portions. This feature allows an individual to customize energy usage in an attempt to provide cost savings. Such scheduling is known with existing "programmable" thermostats.

Other information provided by the user includes information indicating the user's preference for maintaining a setpoint temperature compared to maintaining energy cost savings. In the illustrated example, a parameter Q is used to indicate the weight given by the individual to the desire to maintain the setpoint temperature. A relatively high Q value indicates a strong preference for maintaining temperature, regardless of energy cost savings implications. On the other hand, a relatively low Q value indicates that the individual prefers energy cost savings over maintaining the setpoint temperature.

Another item of information provided to the controller 32 by the user is a nominal cost of energy $R_n$. This parameter indicates the base price of energy used by the controller 32 for making performance index value calculations. The $R_n$ value is used to determine an energy penalty factor R indicating the weight given to the preference to save energy. In one example, $R_n$ is chosen so that R values will be on the same order of magnitude as Q (i.e., within a factor of ten). The energy penalty factor is defined by the equation R=current energy price/$R_n$.

When the controller 32 determines an R value, as the price of energy goes up, the R value increases. When the R value is larger than the Q value, the need to save energy cost outweighs the need to maintain the setpoint temperature. Likewise, when the energy cost is relatively low, and the Q value is larger than the R value, the controller 32 causes the system 24 to operate in a manner that is consistent with a preference for maintaining the setpoint temperature over a desire to maintain energy cost savings.

Other information provided to the controller 32 includes a system gain value, which is understood by those skilled in the art. In this description, the system gain value is labeled by a parameter B. Another parameter entered is a system time constant, A, which is understood by those skilled in the art. The values selected for the system gain value and the system time constant will vary depending upon the particular HVAC system.

Other information provided to the controller 32 includes the current zone temperature as detected by the temperature sensing portion of the thermostat 26. Current energy pricing information received from the outside source 40 also is periodically gathered by the controller 32.

All of the above items of information preferably are utilized by the controller 32 to determine a performance index value indicating the effect of the current energy price level on how the system 24 should be operated, given the user's specified preference level for maintaining temperature comfort compared to maintaining energy cost savings.

Figure 2:
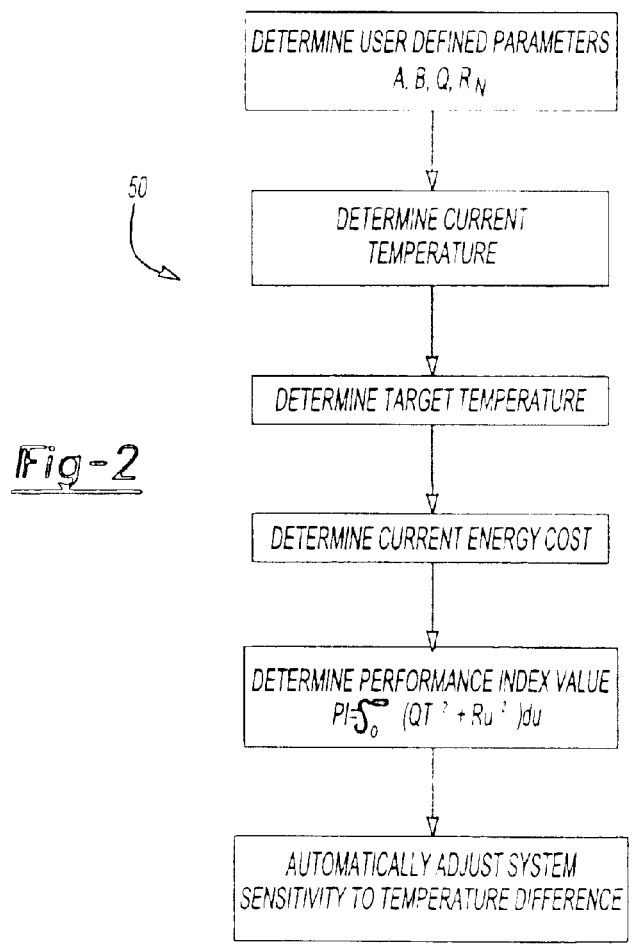
FIG. 2 is a flowchart diagram summarizing a method of this invention.

FIG. 2 is a flow chart diagram 50 summarizing the overall method preferably performed by the controller 32. The controller 32 preferably uses the items of information described above to determine a performance index value that can be described by the equation:

$$PI = \int_0^\infty (QT^2 + Ru^2)du.$$

The performance index PI expresses the relationship between the need to maintain a setpoint temperature and the need to maintain energy cost savings, which accommodates the user's preference. This invention includes using an optimal control solution to solve for the performance index value PI.

According to one example, the degenerate Ricatti equation:

$PA+A^TP+Q-PBR^{-1}B^TP=0$ is used to approximate the performance index integral. In the example degenerate Ricatti equation, P is the performance index value, T is the temperature difference between the setpoint temperature and the current temperature in the zone, A is the system time constant, B is the system gain, Q is the weight factor specified by the user indicating the preference level for maintaining the setpoint temperature and R is the energy penalty or weight value indicating the preference level for maintaining energy cost savings.

The solution for P from the degenerate Ricatti equation then is used in the optimal control gain equation $k^T=-PBR^{-1}$; where k is the optimal control solution gain. The controller 32 preferably then determines a system control signal u where $u=-kT$.

Figure 3:
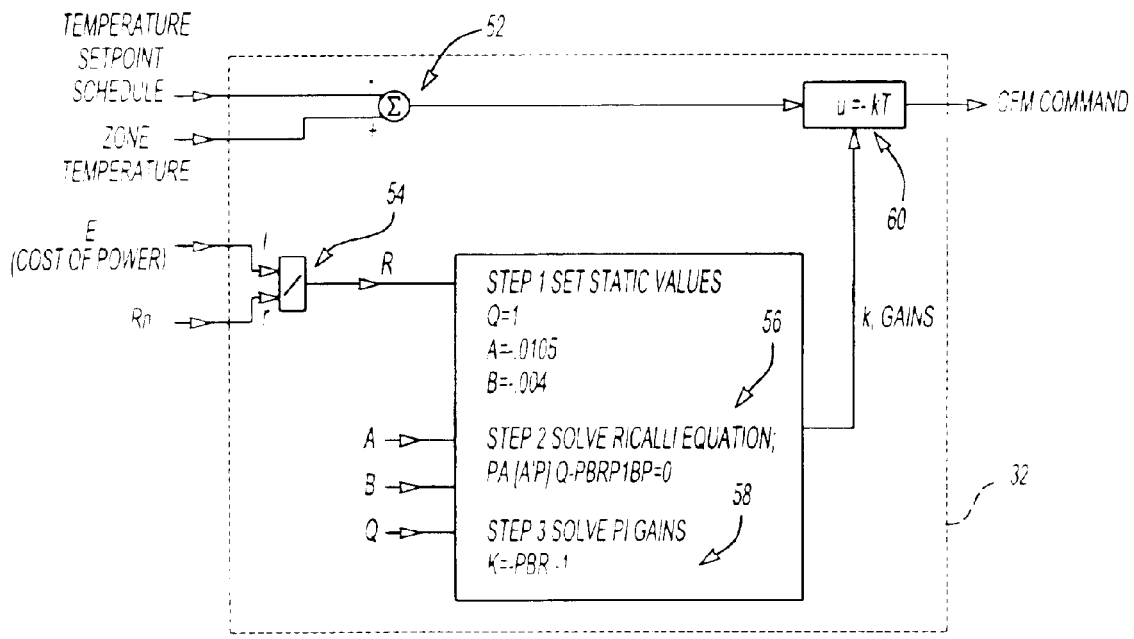
FIG. 3 schematically illustrates a method of this invention.

This approach is schematically illustrated in FIG. 3 where the controller determines the temperature difference T at 52. The controller 32 also determines the R value at 54 by dividing the current energy pricing information received from the outside source 40 by the nominal cost of energy, $R_n$. The determined R value is utilized with the other information entered by the user to solve the degenerate Ricatti equation at 56. The resulting performance index value is then used to determine an optimal control gain value at 58. The optimal control gain value k is then applied at 60 to the system command signal.

Depending on the gain value k, the system operation is modified based upon the performance index value. Lower gain values will effectively decrease the operation of the system responsive to temperature differences T. Higher k gain values, on the other hand, maintain the system response closer to a level as if the energy pricing information were not relevant.

In one example, the optimal control gain value is utilized by the controller 32 to modify the system control signal such that the response time of the system 24 to a temperature difference T is reduced when the performance index value indicates a need to save energy cost. In another example, the controller 32 automatically at least temporarily resets the setpoint temperature as needed depending on the performance index value.

Those skilled in the art who have the benefit of this description will realize that there are a variety of ways to utilize the determined performance index value to alter the system's sensitivity to temperature differences T between the setpoint temperature and the actual temperature in the zone.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of controlling a temperature regulating system, comprising the steps of:
defining a performance index that indicates a desired balance between maintaining a user selected setpoint temperature and conserving energy costs;
determining a current energy cost;
determining a value of the performance index using an optimal control solution and the current energy cost; and
adjusting a sensitivity of the system to a difference between the setpoint temperature and a current actual temperature according to the performance index value.

2. The method of claim 1, including reducing the sensitivity when the performance index value indicates that conserving energy costs is preferable to maintaining the user-selected setpoint temperature based upon the current energy cost.

3. The method of claim 2, including subsequently increasing the sensitivity when the performance index value changes because the current energy cost is relatively lower.

4. The method of claim 1, including reducing the sensitivity responsive to an increase in the energy cost.

5. The method of claim 4, including adjusting the sensitivity by adjusting a time within which the system reacts to the temperature difference.

6. The method of claim 4, including automatically at least temporarily resetting the setpoint temperature responsive to the performance index value.

7. The method of claim 1, including determining the performance index by estimating a value of $$PI = \int_0^\infty (QT^2 + Ru^2)du$$

wherein Q is a user-selected weighting factor indicating the user's desire to maintain the setpoint temperature;
T is the temperature difference;
R is a determined weighting factor indicating the need to balance energy cost savings with the user's desire to maintain the setpoint temperature; and
u is a value indicating system operation responsive to the temperature difference.

8. The method of claim 7, including estimating the performance index using a degenerate Ricatti equation.

9. The method of claim 1, including using the performance index value to determine a gain value and applying the gain value to the system control signal.

10. The method of claim 9, including determining the gain value by determining a value of $k^T=-PBR^{-1}$
wherein k is the gain value;
P is the estimated performance index value;
B is a predetermined system gain value; and
R is a determined weighting factor indicating the need to balance energy cost savings with the user's desire to maintain the setpoint temperature.

11. A temperature regulating system, comprising:
a thermostat device having a user input portion that allows a user to input a setpoint temperature and a sensor portion that provides an indication of a current temperature near the thermostat device;
a communication module that is capable of receiving information from an outside source remote from the thermostat device; and
a controller that determines a current energy price from information received by the communication module, determines a performance index value indicative of a balance between a user-specified desire to maintain the setpoint temperature and energy cost savings and automatically adjusts a sensitivity of the system to a difference between the current temperature and the setpoint temperature according to the performance index value.

12. The system of claim 11, wherein the controller automatically slows down a response time of the system to the temperature difference responsive to an increase in energy costs.

13. The system of claim 11, wherein the controller automatically at least temporarily resets the setpoint temperature responsive to an increase in energy costs.

14. The system of claim 11, wherein the controller automatically adjusts a gain of a control value that directs an amount of airflow through the system according to the performance index value.

15. The system of claim 11, wherein the controller determines the gain value by determining a value of $k^T = -PBR^{-1}$ wherein k is the gain value;

P is the estimated performance index value;

B is a predetermined system gain value; and

R is a determined weighting factor indicating the need to balance energy cost savings with the user's desire to maintain the setpoint temperature.

16. The system of claim 11, wherein the controller determines the performance index by estimating a value of $$PI = \int_0^\infty (QT^2 + Ru^2)\,du$$

wherein Q is a user-selected weighting factor indicating the user's desire to maintain the setpoint temperature;

T is the temperature difference;

R is a determined weighting factor indicating the need to balance energy cost savings with the user's desire to maintain the setpoint temperature; and u is a value indicating system operation responsive to the temperature difference.

17. The system of claim 16, wherein the controller estimates the performance index using a degenerate Ricatti equation.

18. The system of claim 16, wherein R is a ratio of the current energy price to a predetermined nominal energy price.

* * * * *